United States Patent [19]
Zaretsky

[11] Patent Number: 5,864,454
[45] Date of Patent: Jan. 26, 1999

[54] AUTOMATIC SURGE SUPPRESSOR DISCONNECT PROTECTION SYSTEM

[75] Inventor: Albert Zaretsky, Brooklyn, N.Y.

[73] Assignee: Leviton Manufacturing Co., Inc., Little Neck, N.Y.

[21] Appl. No.: 821,833

[22] Filed: Mar. 21, 1997

Related U.S. Application Data

[63] Continuation of Ser. No. 465,663, Jun. 5, 1995, Pat. No. 5,617,288.

[51] Int. Cl.$^6$ ....................................................... H02H 1/04
[52] U.S. Cl. ............................................. 361/127; 361/91
[58] Field of Search .................................. 361/15, 16, 17, 361/42, 91, 103, 127, 119

[56] References Cited

U.S. PATENT DOCUMENTS

| | | | |
|---|---|---|---|
| 4,174,529 | 11/1979 | Hamann | 361/16 |
| 4,636,910 | 1/1987 | Chadwick | 361/103 |
| 5,617,288 | 4/1997 | Zaretsky | 361/127 |

*Primary Examiner*—Sally C. Medley
*Attorney, Agent, or Firm*—Paul J. Sutton

[57] ABSTRACT

A surge suppressor disconnect protection circuit is coupled to a first surge suppressor. The first surge suppressor is electrically coupled to phase and neutral line terminals of an AC source to protect the first surge suppressor from predetermined overvoltages. The circuit includes a relay switch with a relay contact and a relay drive coil. The relay contact is setable to one of a high and a low impedance state. The relay contact is electrically connected to the first surge suppressor and to one of the line terminals. A signal adjuster is electrically connected at its phase port to the AC phase terminal and to the AC neutral terminal for rectifying AC to generate a DC signal. The adjuster filters the DC signal and scales the filtered DC signal. An amplifier is electrically coupled to the adjuster at a non-inverting input port and to a first voltage reference at an inverting input port. The amplifier output port is electrically coupled back to the inverting input port to provide a feedback path therebetween. An integrator displaying a predefined integrator time constant is electrically connected at its input port to the amplifier means such that a signal is generated at the integrator output port which is proportional to a length of time the scaled DC signal is greater than said first voltage reference. A non-inverting input of a comparator is electrically connected to the integrator output port, and an inverting port of the comparator is electrically connected to a second voltage reference. The comparator output is electrically coupled to the first end of the relay coil such that a current is provided to the relay coil which drives the contact to a high impedance state when the integrator output signal exceeds the second voltage reference.

19 Claims, 1 Drawing Sheet

AUTOMATIC SURGE SUPPRESSOR DISCONNECT PROTECTION SYSTEM

This is a continuation of application Ser. No. 08/465,663 filed on Jun. 5, 1995 now U.S. Pat. No. 5,617,288.

BACKGROUND OF THE INVENTION

Most semiconductor devices are intolerant of excessive voltage; destructive breakdown or damage can occur in semiconductor devices when subjected to transient overvoltages that persist for only a few microseconds. Transient Voltage Surge Suppression (TVSS) devices, referred to interchangeably herein as surge suppressors and voltage-clamping devices, are commonly known for use in suppressing such overvoltage transients to protect voltage-surge intolerant circuitry. TVSS devices commonly include nonlinear, voltage-dependent resistive elements which display electrical behavior similar to that displayed by a pair of series-connected, back-to-back zener diodes. At normal voltages, below the TVSS clamping voltage level, TVSS devices display a high resistance with a small leakage current. When subjected to large transient voltages (above the TVSS device's clamping voltage), the TVSS device is forced by its characteristics to operate in a low resistance region which increases current flow through the device. The increased current produces an increased voltage drop across the source impedance, effectively clamping the transient voltage to a level determined acceptable (i.e., safe) for the protected circuit. The potentially destructive surge energy is thereby dissipated or passed through the voltage-clamping (TVSS) device and its operating current returns to its normal range after the surge.

Avalanche diode suppressors, metal oxide varistors (MOVs) and selenium surge suppressors may be utilized as TVSS devices with varying advantages and disadvantages, such as an MOV-based TVSS's inherently susceptibility to failure under certain conditions. More specifically, MOV components have a tendency to explode when overheated, often with sufficient explosive power to fracture plastic housings and sheet metal enclosures within which they reside. The explosion usually completely destroys everything within the TVSS housing and may possibly shoot hot black powder through any small openings in the housing. Various techniques have developed to protect MOVs from the causative factors leading to such explosive conditions.

One technique for protecting metal oxide varistors (MOVs) requires adding a current fuse in series with the MOV, which trips to an open state to protect the MOV when particular transient overvoltages are detected. Transients with $I^2t$ ratings that are greater than the fuse rating, but just below the MOV rating will blow the fuse, electrically removing the MOV from the overvoltage condition. Under circumstances where the fuse displays an $I^2t$ rating such that commonly occurring transients are insufficient to blow the fuse, i.e., from a few to 10,000 amperes, but of insufficient magnitude to force the MOV to its low impedance state, the MOV is subjected to overheating, possibly leading to thermal runaway. Steady state, abnormal overvoltage conditions below those at which the fuse will blow may also generate sufficiently high currents through the MOV leading to dangerous overheating.

A second common technique for protecting MOVs from overheating due to abnormal steady state or transient overvoltage conditions utilizes a thermal cutoff device (TCO) provided electrically in series with the MOV. TCOs sense the surface temperature of the MOV and trip to a high impedance state (open circuit) at a particular maximum rated temperature, cutting off voltage to the MOV. Thermal cutoff devices, however, like current fuses are not without problems when used within MOV-protected circuits. In particular, it is extremely difficult, and sometimes impossible to achieve good thermal contact between a surface of the MOV and a thermal cutoff device. Consequently, the MOV may overheat to a point of thermal runaway before the critical temperature is detected and the overvoltage is cut-off from the MOV by the TCO. Further, mismatch problems may also occur between the time constant of the thermal cutoff (i.e., time to blow) and heating/time characteristics of the MOV even when good temperature detection is possible, rendering accurate MOV protection unreliable. And in addition, both current fuses and temperature cut offs are permanently opened so that although explosions may be prevented, the transient voltage surge suppressor function is permanently lost.

It would therefore be desirable to have available an MOV overvoltage protection circuit which is effective in reliably cutting off voltage to the MOV to prevent damaging overheating in the MOV, after which the MOV is connected back into the circuit. Preferably, the MOV protection circuit would effectively protect the MOV whether the overvoltage conditions are continuous or temporary (i.e., transients). It would also be desirable to have available an MOV overvoltage protection circuit which cuts off voltage across the MOV in accordance with a length of time for which the MOV is subjected to a specific overvoltage level, and the MOV's thermal time constant. After a time period defined according thereto is run, the protection circuit would disconnect the MOV from the AC source. The time of cutoff would theoretically be just prior to the point in time at which the MOV would have failed. When the temperature of the MOV is detected to be at a safe MOV operating level, the MOV would be coupled back into the circuit thereby minimizing a time in which the MOV is electrically removed from the circuit it was meant to protect.

BRIEF SUMMARY OF THE INVENTION

A surge suppressor protection circuit for automatically electrically disconnecting a surge suppressor electrically coupled between a phase and a neutral port of a circuit protected by the surge suppressor (i.e., a load circuit) at the occurrence of a predetermined overvoltage condition. Both the protection circuit and the protected load circuit are parallel connected to an AC source. The protection circuit includes means for disconnecting the surge suppressor from its path to the AC source; preferably a relay switch containing a relay contact and relay drive means. The relay contact is electrically interposed between the load circuit phase port and the surge suppressor and is positionable to one of a high and a low impedance state; the high impedance state (i.e., open circuit) effectively isolates the surge suppressor from the AC source. The relay drive means is electrically connected between the surge suppressor and the load circuit phase port. Also included in the circuit is a signal adjuster with a phase port, a neutral port, and a DC port. The adjuster is electrically connected at its phase port to the load circuit phase port and at its neutral port to the load circuit neutral port (in parallel with the suppressor/contact series combination) for rectifying an AC signal provided by the AC source. The adjuster then filters the rectified DC, and scales the rectified DC to form a scaled DC signal, which is proportional to the AC source.

The circuit also includes an amplifier with both an inverting and non-inverting input port, and an amplifier output port which is electrically coupled to the inverting input port as a feedback path. The inverting input port is also connected to a first voltage reference which is proportional to a maximum rated voltage of the surge suppressor. The non-inverting input port is electrically coupled to the signal adjuster supply port. The amplifier generates a difference signal proportional to a difference between the scaled DC signal and the first voltage reference. The difference signal is positive when the scaled DC signal is greater than the first voltage reference; the difference signal is negative when the scaled DC signal is less than the first voltage reference.

The amplifier output is coupled to an integrator circuit. The integrator circuit, in combination with the amplifier and a comparator circuit, act essentially as a timer to track the overvoltage and the length of time of which the overvoltage (to which the scaled DC voltage signal is proportional) exceeds the level of the first voltage reference. The comparator circuit is electrically connected at its non-inverting input to the integrator output, and at its inverting input to a second voltage reference. Accordingly, a signal output from the integrator is constantly compared with the second voltage reference and generates a control signal based thereon. The relay driver is electrically responsive to the comparator output (control signal) for defining the state of the relay contact thereby controlling the voltage across the surge suppressor. Preferably, a low-current second surge suppressor is electrically connected between the amplifier means and the integrator for proportionally adjusting an amplitude of the amplifier means output signal. The second suppressor provides nonlinear voltage, current and thermal characteristics representative of those of the first suppressor, rendering protection of the first suppressor more reliable.

Accordingly, the automatic surge suppressor disconnect protection system of this invention provides an effective device for protecting a surge suppressor (e.g., MOV) that is subjected to steady state or transient voltages that are high enough to cause overheating within the surge suppressor device, but not high enough to trip an in-line fuse associated with the device to a high impedance state. In addition, the surge suppressor protection is provided in such a way that the surge suppressor is not disconnected from the circuit unless it has been driven to a point just below its point of breakdown, minimizing the time in which the device is electrically removed from the circuit and therefore not available to perform its function of protecting the load circuitry from overvoltage conditions.

DETAILED DESCRIPTION OF THE INVENTION

Figure 1:
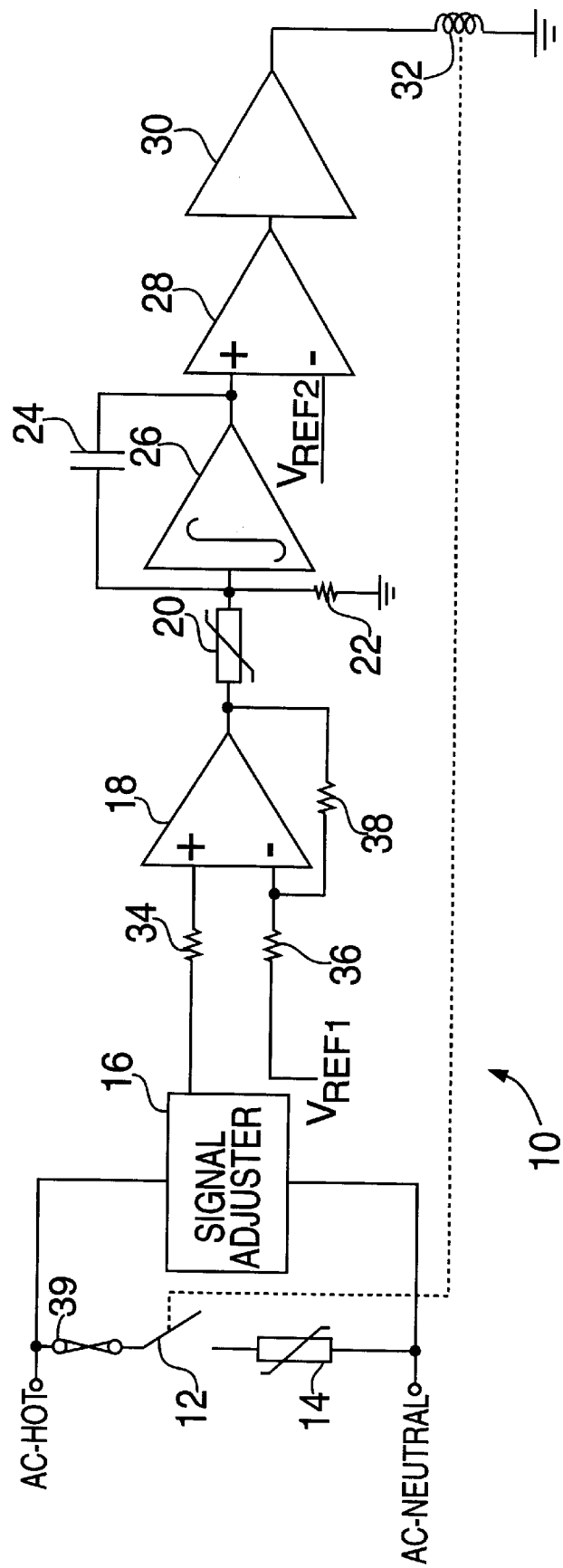
FIG. 1 is a schematic diagram of a preferred embodiment of the automatic surge suppressor disconnect protection system of this invention.

As described above, various techniques are known for protecting surge suppression devices, e.g., metal oxide semiconductors (MOVs), from abnormal power line overvoltage conditions which may cause overheating and/or damage in the device. For example, high continuous line voltages which are high enough to cause overheating in the surge suppression device, but not high enough to push the surge suppressor into a low impedance state (i.e., a surge suppression state), can cause overheating and possible damage to the surge suppressor. High line voltages commonly result from open neutral fault conditions which may cause high currents to flow through the surge suppression device. In-line fuses and thermal cutoff devices tend to provide inaccurate surge suppressor protection. Because surge suppressors may be temperature correlated with varying overvoltage conditions, a definitive surge suppression device temperature rise can be estimated from the time at which the surge suppressor is subjected to an overvoltage condition.

By coordinating surge suppressor voltage, times for which the surge suppressor is subjected to such voltages, and the surge suppressor temperature characteristics, an ideal time can be calculated for disconnecting the surge suppressor from the AC power source just prior to that point at which damage will result from the overvoltage. In a case where the surge suppressor in implemented with a metal oxide varistor (MOV), thermal time constants may be determined by measurement of MOV device voltage/temperature characteristics, or may be supplied by an MOV manufacturer in a form of thermal gradient data relating MOV temperature to overvoltage and time. Accordingly, an automatic surge suppressor disconnect protection system presented herein will be described particularly with reference to an MOV surge suppressor or disconnect protection system 10, as shown in FIG. 1, preferably for use with GFCI circuits. The MOV-based description of the invention, however, is for illustration purposes only, and is not meant to limit the scope of the invention.

Surge protection system 10 includes AC-HOT and AC-NEUTRAL ports which are electrically connectable to a protected circuit's, i.e., a load circuit, phase and neutral ports. The load circuit phase and neutral ports are typically connected directly to phase and neutral lines of an AC source. The AC-HOT and AC-NEUTRAL ports are also electrically coupled to phase and neutral ports, respectively, of a signal adjuster 16. A series combination of relay contact 12, of a relay switch 31, and a first metal oxide varistor (MOV) 14 and a current fuse 39 are shunted across the signal adjuster to ports AC-HOT and AC-NEUTRAL, receptively. An output port of signal adjuster 16 is electrically connected, preferably through a resistor 34, to a non-inverting input port of an op amp 18. An inverting input port of op amp 18 is electrically connected to a first reference voltage, $V_{REF1}$, via resistor 36. An output of the op amp 18 is electrically coupled to an integrating op amp 26, as well as to the inverting input of op amp 18 through a resistor 38 in order to supply feedback thereto.

In the preferred embodiment, the op amp output is coupled into the integrator circuit through a second MOV 20. An output of op amp integrator 26 is provided to a non-inverting input of a comparator 28, and back to its input port with an electrical feedback path formed through a capacitor 24. A resistor 22 is also electrically connected between the integrating op amp input and ground, together with the capacitor 24 defining an integration time constant. The integrator formed thereby defines an output signal which is proportional to both the overvoltage and time it is applied as the scaled DC signal (which is proportional to the overvoltage). An inverting input of comparator 28 is electrically connected to a second reference voltage, $V_{REF2}$. The comparator output is electrically coupled to relay coil 32 of relay switch 31, preferably through a buffer amplifier 30. When the integrator output signal overcomes the second voltage signal, VREF2, a signal is generated (i.e., the comparator output) which actuates the relay coil causing the relay contact to trip and electrically disconnect the first MOV 14 from the overvoltage condition.

The time period defined by the integrator/comparator 28 combination is substantially proportional to a time in which the amount of overvoltage would theoretically cause the first MOV 14 to go into a thermal runaway heat condition. So, if the suppressor system 10 detects an overvoltage condition present at the MOV, it anticipates the critical time at which a MOV suppressor may be subjected to the detected overvoltage before being damaged. The invention actually tracks the time the MOV is subjected to the overvoltage, adjusting the integrator output both up and down as the overvoltage varies overtime.

The anticipated cutoff time, which is dependent on the integration time constant, is calculated in accordance with the first MOV's thermal time constant at the particular overvoltage. The second MOV surge suppressor utilized herein is preferably that of a low voltage type in order to control the input impedance of the source as seen by the integrator and therefore provide a non-linear time constant similar to the MOV non-linearity. Accordingly, the integrator is able to replicate both the thermal and the voltage/current nonlinearity characteristics of the MOV to be protected and disconnect the MOV from the AC source, if necessary, without damage to the device. When the voltage returns to normal, the first MOV is automatically switched back into the circuit, accurately preventing unnecessary or erroneous MOV disconnect time.

Detailed operation is as follows. Current fuse 39 prevents MOV explosions for microsecond kiloamp transients which are too short in time for relay contacts 12 to open. Signal adjuster 16 rectifies AC line voltage present at terminals AC-HOT and AC-NEUTRAL (i.e., transient or steady state overvoltages). Substantially all 60 Hz ripple is filtered from the rectified (DC) signal therein. In addition, signal adjuster 16 scales the filtered DC signal to an appropriate level for the subsequent amplifier stage (op amp 18). The op amp output voltage signal is equal to a positive or negative difference between the scaled DC signal and $V_{REF1}$. $V_{REF1}$, therefore, is defined as the maximum voltage which the first MOV 14 may be subjected without protection, i.e., at voltages above $V_{REF1}$, damage may occur to the first MOV after a certain time.

The integrator output is dependent upon the magnitude of its input, i.e., the output of op amp 18. If the op amp output (i.e., the difference between the scale DC output representing the overvoltage and $V_{REF1}$) is positive, the integrator output is increasing. In other words, when the DC signal exceeds the level of VREFI, the integrator starts tracking the time of the overvoltage. If the increase in the difference between the scaled DC signal increases, the integrator makes note of the increase and the time at which the first MOV is subjected to the increase. However, if the scaled DC signal drops below $V_{REF1}$, the op amp output goes negative in proportion to the difference. This effects the level of the integrator output, lowering it at a rate which is dependent on the input. Depending on the level of the op amp output, which drives the integrator, comparator 28 will determine when it is time to remove the overvoltage at the first MOV. In other words, the time at which the integrator output exceeds $V_{REF2}$, the comparator outputs an interrupt signal to the relay coil, which trips the contact. This "cutoff" time corresponds to both the overvoltage level and the time of which the circuit is subjected to the overvoltage. When the signal output from the integrator, in accordance with $V_{REF1}$, drops below $V_{REF2}$, the comparator output changes, which allows the contact to fall into a low impedance state.

The embodiment of the invention disclosed in the present specification, drawings and claims are presented merely as an example of the invention. Other embodiments, forms, or modifications thereof will readily suggest themselves and are contemplated as coming within the scope of the present invention, which is defined by the following claims.

What is claimed is:

1. A surge suppressor disconnect protection circuit for protecting a first surge suppressor from overvoltages, said first surge suppressor electrically coupled between phase and neutral terminals which electrically connect to an AC source, said protection circuit comprising:

a) switching means including a contact settable to one of a high and a low impedance state in accordance with an interrupt signal, said switching means electrically connected between said first surge suppressor and one of said phase and neutral terminals;

b) signal adjuster means having a phase input port, a neutral input port and a DC output signal port, said phase input port electrically coupled to said phase terminal and said neutral input port electrically coupled to said neutral terminal, said signal adjuster means rectifying the AC from said AC source to generate a DC signal, filtering and scaling said DC signal and making it available on said DC output signal port;

c) amplifier means having a non-inverting input port, an inverting input port and an amplifier means output port, said non-inverting input port electrically coupled via a first resistor to said DC output signal port to receive said DC signal, said inverting input port electrically coupled to a first voltage reference signal source via a second resistor and to said amplifier means output port via a third resistor; said amplifier means generating at said amplifier means output port, a difference signal indicative of a difference between said first voltage reference signal and said DC signal;

d) integrator means having an input port and an output port, said input port of said integrator means is electrically coupled to said amplifier means output port which is also electrically coupled via a fourth resistor to ground and via a capacitor to said output port of said integrator means; said integrator means generating a timer signal a magnitude of which is proportional to the magnitude of said difference signal and a time said difference signal is maintained at said magnitude; and e) comparing means having a non-inverting input port, an inverting input port and a comparing means output port, said non-inverting port of said comparing means electrically coupled to said output port of said integrator means, said inverting port of said comparing means is electrically coupled to a second voltage reference signal source; said comparing means generating an interrupt signal based upon a comparison of said timer signal with said second voltage reference signal.

2. The protection circuit, as defined in claim 1, further comprising fusing means electrically coupled in series with said first surge suppressor for protecting said suppressor from transients within a kiloamp/microsecond range.

3. The protection circuit, as defined in claim 1, wherein said difference signal is proportional to a difference between said overvoltage and a maximum voltage to which said first surge suppressor may be subjected without sustaining permanent damage.

4. The protection circuit, as defined in claim 3, wherein said first reference signal is substantially proportional to an overvoltage which is less than a maximum rated voltage of said first surge suppressor but large enough to cause substantial heating within said first surge suppressor.

5. The protection circuit, as defined in claim 1, wherein said interrupt signal is generated just prior to a predetermined time at which said first surge suppressor would suffer heat damage when subjected to overheating caused by said overvoltage.

6. The protection circuit, as defined in claim 1, wherein said difference signal is positive when said DC signal is greater than said first voltage reference signal and negative when said DC signal is less than said first reference signal.

7. The protection circuit, as defined in claim 1, further including a second surge suppressor electrically interposed between said amplifier output port and said integrator means.

8. The protection circuit, as defined in claim 7, wherein said second surge suppressor simulates nonlinear voltage, current and thermal characteristics representative of said first surge suppressor such that a non-linear time constant is imparted to said integrator means.

9. The protection circuit, as defined by claim 8, wherein said second surge suppressor is a metal oxide varistor.

10. The protection circuit, as defined in claim 9, wherein said second metal oxide varistor is a low-power and low-voltage metal oxide varistor.

11. The protection circuit, as defined in claim 1, further comprising a buffer amplifier interposed between said comparing means and a first end of a relay coil, said relay coil capable of placing said switching means into a high impedance state upon receipt of an interrupt signal.

12. The protection circuit defined by claim 1, wherein said first surge suppressor is a metal oxide varistor (MOV).

13. The protection circuit, as defined in claim 1, wherein said phase and neutral terminals are electrically coupled to a circuit to be protected by said first surge suppressor.

14. The surge suppressor disconnect protection circuit, as defined in claim 1, wherein said switching means returns to said high impedance state when said overvoltages are no longer present between said phase and neutral terminals.

15. A ground fault circuit interrupter system including surge suppressor protection, comprising:

a) a ground fault circuit interrupter electrically connected to phase and neutral terminals of an AC source;

b) a first surge suppressor electrically coupled to said phase and neutral terminals, respectively, for protecting said ground fault circuit interrupter from predetermined overvoltages;

c) a surge suppressor disconnect protection circuit electrically coupled to said first surge suppressor and said phase and neutral terminals for protecting said first surge suppressor from said predetermined overvoltages by disconnecting said first surge suppressor from said AC source terminals under predetermined conditions, said surge suppressor disconnect protection circuit comprising:

d) a relay switch including a set of relay contacts and a relay operating coil each having first and second ends, wherein said relay contacts are settable to one of a high and a low impedance state in accordance with a disconnect signal and wherein said contacts are electrically coupled at said first end to a first end of said first surge suppressor and at said second end to one of said phase and neutral terminals;

e) signal adjuster means comprising a phase input port coupled to said phase terminal of said AC source, a neutral input port coupled to said neutral terminal of said AC source and a DC signal output port; said signal adjustment means rectifies the AC present at said phase and neutral input ports to generate a DC signal, filters and scales said DC signal and provides a scaled DC signal at said DC signal output port;

f) amplifier means comprising a non-inverting input port electrically coupled to said DC signal output port by means of a first resistor, an inverting input port electrically coupled to a first voltage reference signal source by means of a second resistor, and an amplifier means output port electrically coupled to said amplifier means inverting input port by means of a third resistor to provide a feedback therebetween; a difference signal is provided at said amplifier means output port equal to a difference between said scaled DC signal applied to said amplifier means non-inverting input port and said first voltage reference signal applied to said amplifier means inverting input port;

g) an integrator having an integrator input port electrically coupled to said amplifier means output port, said integrator input port also electrically coupled to ground by means of a fourth resistor and to an integrator output port by means of a capacitor; said integrator providing at said integrator output port a time-out signal which is proportional to said difference signal and a time during which said difference signal is present; and h) a comparator having a non-inverting input port electrically coupled to said integrator output port, an inverting input port electrically coupled to a second voltage reference signal source, and a comparator output port electrically coupled to said first end of said relay coil; said comparator generating a disconnect signal in accordance to a comparison of said time-out signal and said second voltage reference signal.

16. The ground fault circuit interrupter system, as defined by claim 15, further comprising a second surge suppressor interposed between said amplifier means and said integrator.

17. The ground fault circuit interrupter, as defined by claim 16, wherein said first and second surge suppressors comprise metal oxide varistors.

18. A surge suppressor disconnect protection circuit for protecting a first surge suppressor from overvoltages, said first surge suppressor electrically coupled to phase and neutral terminals of an AC source, comprising:

a) a relay switch including relay contacts and a relay operating coil, each having first and second ends, wherein said relay contacts are settable to one of a high and a low impedance state in accordance with an interrupt signal provided across said relay operating coil and wherein said relay contacts are electrically coupled between said first surge suppressor and said AC source phase terminal;

b) signal adjuster means including phase, neutral and DC ports, wherein said signal adjuster means phase port is electrically connected to said AC source phase terminal and neutral port is electrically connected to said AC source neutral terminal for rectifying the AC from said AC source to generate a DC signal, filtering and scaling said DC signal to produce a scaled DC signal at said DC port;

c) an amplifier having a non-inverting input port, an inverting input port and an amplifier output port; said non-inverting input port electrically coupled to said signal adjuster means DC port by means of a first resistor, said inverting input port coupled to a first voltage reference signal source by means of a second resistor and to said amplifier output port via a third resistor to provide a feedback path such that a difference signal substantially equal to a difference between a first voltage reference signal and said scaled DC signal is generated and provided at said amplifier output port;

d) an integrator electrically coupled at its input port to said amplifier output port for generating at an integrator output port a timer signal which is proportional to said difference signal and a period of time during which said difference signal is present; and e) a comparator having a non-inverting input port electrically coupled to said integrator output port, an inverting input port electrically coupled to a second voltage reference signal source and a comparator output port; said comparator generating an interrupt signal at said comparator output port when the difference between said timer signal and said second voltage reference signal is approximately zero.

19. The surge suppressor disconnect protection circuit, as defined in claim 18, wherein said first surge suppressor is a metal oxide varistor.

* * * * *